United States Patent
Hsiao et al.

(10) Patent No.: US 11,063,512 B1
(45) Date of Patent: Jul. 13, 2021

(54) POWER CONVERSION SYSTEM

(71) Applicant: Chicony Power Technology Co., Ltd., New Taipei (TW)

(72) Inventors: Yung-Hung Hsiao, New Taipei (TW); Chia-Hsien Yen, New Taipei (TW); Da-Shian Chen, New Taipei (TW); Hao-Chieh Chang, New Taipei (TW); Cheng-Chang Hsiao, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/867,549

(22) Filed: May 5, 2020

(30) Foreign Application Priority Data

Jan. 14, 2020 (TW) .................................. 109101252

(51) Int. Cl.
| | |
|---|---|
| *H02M 1/36* | (2007.01) |
| *H02M 3/158* | (2006.01) |
| *H02M 3/04* | (2006.01) |
| *H02M 1/42* | (2007.01) |
| *H02M 7/06* | (2006.01) |

(52) U.S. Cl.
CPC ........... *H02M 3/04* (2013.01); *H02M 1/4225* (2013.01); *H02M 7/06* (2013.01)

(58) Field of Classification Search
CPC ........ H02M 3/04; H02M 1/4225; H02M 7/06; H02M 2001/0067; H02M 2001/007; H02M 3/156; H02M 3/158; H02M 1/32; H02M 1/36
See application file for complete search history.

(56) References Cited

U.S. PATENT DOCUMENTS

| | | | |
|---|---|---|---|
| 5,161,097 A * | 11/1992 | Ikeda ................... | H02J 2207/20 363/124 |
| 9,343,967 B2 | 5/2016 | Shao | |
| 9,387,766 B2 | 7/2016 | Hao et al. | |
| 9,729,055 B1 * | 8/2017 | Yao ..................... | H02M 3/1588 |
| 10,158,291 B1 | 12/2018 | Cinagrossi et al. | |
| 2006/0006850 A1 * | 1/2006 | Inoue ................... | H02J 2207/20 323/265 |
| 2009/0027930 A1 | 1/2009 | Usui | |

(Continued)

FOREIGN PATENT DOCUMENTS

| CN | 101355312 B | 11/2011 |
|---|---|---|
| CN | 103997827 B | 4/2016 |

(Continued)

*Primary Examiner* — Gary L Laxton
(74) *Attorney, Agent, or Firm* — CKC & Partners Co., LLC

(57) ABSTRACT

A power conversion system includes a first and a second energy storage element, a first boost circuit, a switching element, a control circuit and a detection circuit. The first boost circuit is coupled between the first and the second energy storage element. The switching element is coupled to the first boost circuit in parallel. When the first voltage value is lower than a first preset level, the control circuit turns off the switching element and drives the first booster circuit to maintain a second voltage value according to the first voltage value, so that the power conversion system operates in a first state. When the first voltage value is equal to or larger than the first preset level, the control circuit turns on the switching element and turns off the first boost circuit, so that the power conversion system operates in a second state.

9 Claims, 7 Drawing Sheets

(56) References Cited

U.S. PATENT DOCUMENTS

| | | | | |
|---|---|---|---|---|
| 2015/0333616 | A1* | 11/2015 | Li | H02M 1/143 |
| | | | | 713/300 |
| 2017/0149332 | A1* | 5/2017 | Tanigawa | H02M 1/08 |
| 2020/0177017 | A1* | 6/2020 | Reilly | H02M 3/1584 |

FOREIGN PATENT DOCUMENTS

| | | |
|---|---|---|
| CN | 106411154 A | 2/2017 |
| TW | 201902104 A | 1/2019 |
| TW | M580822 U | 7/2019 |

\* cited by examiner

POWER CONVERSION SYSTEM

CROSS-REFERENCE TO RELATED APPLICATION

This application claims priority to Taiwan Application Serial Number 109101252, filed Jan. 14, 2020, which is herein incorporated by reference in its entirety.

BACKGROUND

Technical Field

The present disclosure relates to a power conversion system, and more particularly, to a device capable of supplying power to a load.

Description of Related Art

A power supply is a device that converts AC power to DC power to drive an electronic device. The power supply performs power conversion according to different states of the electronic device to ensure that the power provided meets the power requirements of the electronic device. When the electronic device operates in different states, the power requirements are also different. Therefore, the power conversion system in the power supply must be dynamically adjusted accordingly, and the power conversion capability of the power supply will directly affect the stability of the electronic device.

SUMMARY

One aspect of the present disclosure is a power conversion system, including a first energy storage element, a second energy storage element, a first boost circuit, a switching element, a detection circuit and a control circuit. The first energy storage element has a first voltage level. The second energy storage element has a second voltage level. The first boost circuit is electrically coupled between the first energy storage element and the second energy storage element. The switching element is electrically coupled in parallel to the first energy storage element. The control circuit is electrically coupled to the first boost circuit and the switching element. The detection circuit is electrically coupled to the first energy storage element and the control circuit, and configured to detect the first voltage level. When the first voltage level is less than a first preset level, the control circuit turns off the switching element, and drives the first boost circuit to maintain the second voltage level according to the first voltage level, and the power conversion system operates in a first state. When the first voltage level is greater than or equal to the first preset level, the control circuit turns on the switching element, and turns off the first boost circuit, and the power conversion system operates in a second state.

Accordingly, when the load requires operation at peak power during a short period of time (e.g., at a certain moment), the power conversion system can turn off the switching element and use the first boost circuit to draw the power of the first energy storage element for boosting, so that the output voltage and output current meet the requirements of the load.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments below described in detail with the accompanying drawings are not provided to limit the scope of the present disclosure. Moreover, the operation of the described structure is not for limiting the order of implementation. Any device with equivalent functions that is produced from a structure formed by a recombination of elements is covered by the scope of the present disclosure. The drawings are for the purpose of illustration only, and not drawn in accordance with the original size.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. As used herein, the term "and/or" is used to mean that either or both of the associated listed items may be affected or involved.

When a processor of a computer or a server (e.g., a central processing unit or a graphics processing unit) is performing calculations, its power is dynamically changed. When the processor requires operation at peak power during a short period of time (e.g., at a certain moment), a power supply must provide corresponding energy to ensure that the driving of the processor is stable. The above problem can be solved by increasing the size of an output capacitor or adding an additional buffer capacitor. However, the foregoing methods will affect the size, cost and switching timing of the power supply, and so such methods are not ideal. The present disclosure provides a power conversion system, which can provide corresponding power when a load (e.g., a processor) requires operation at peak power during a short period of time. In addition, the power conversion system may supply peak power during a short period of time, but not limited to this. The above "short period of time" means a certain moment or moment in milliseconds. The length of the short period will vary depending on how the power conversion system and load are applied.

Figure 1:
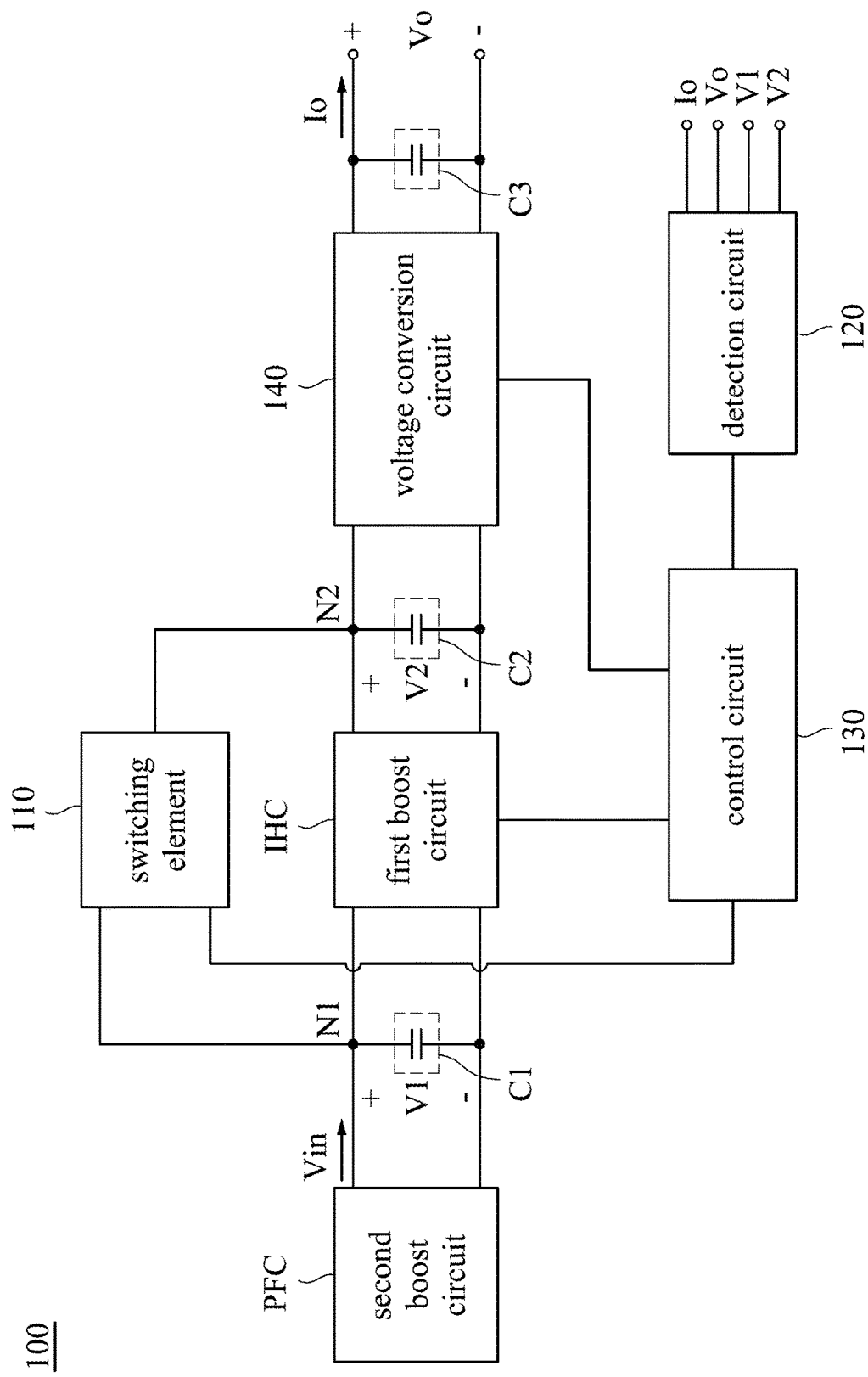
FIG. 1 is a schematic diagram of a power conversion system in some embodiments of the present disclosure.

FIG. 1 is a schematic diagram of a power conversion system in some embodiments of the present disclosure. The power conversion system 100 includes a first boost circuit IHC, a first energy storage element C1, a second energy storage element C2, a switching element 110, a detection circuit 120 and a control circuit 130. In this embodiment, the power conversion system 100 is applied to a power supply to output a converted power to a load (e.g., an electronic device with a central processing unit, a graphics processing unit, or other computing circuits).

Figure 2:
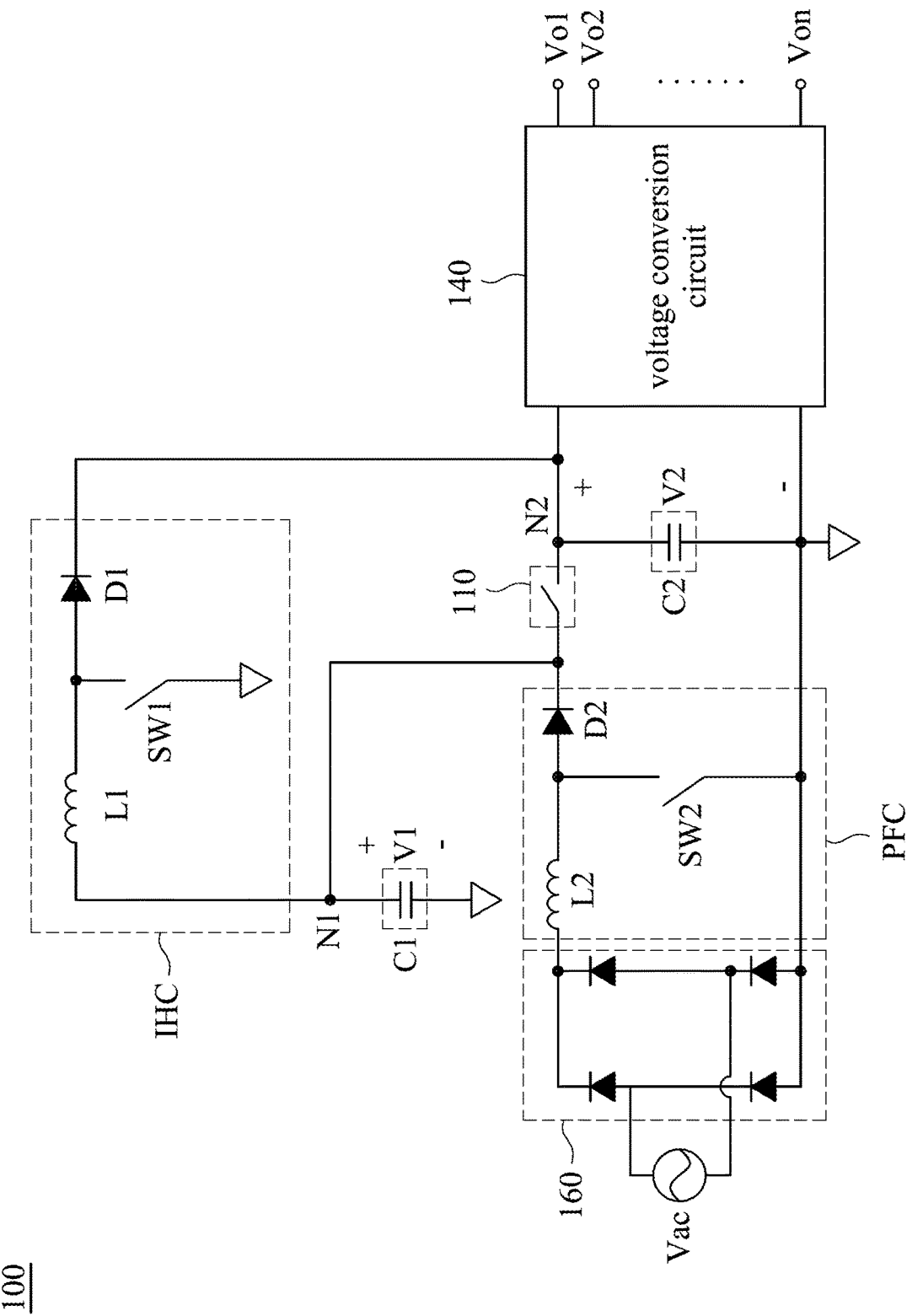
FIG. 2 is a schematic diagram of a partial circuit of the power conversion system in some embodiments of the present disclosure.

Reference is made to FIG. 1 and FIG. 2, in which FIG. 2 is a schematic diagram of a partial circuit of the power conversion system 100 in some embodiments of the present disclosure. The first energy storage element C1 is electrically coupled to a first node N1, and has a first voltage level V1. One terminal of the first boost circuit IHC and one terminal of the switching element 110 are electrically coupled to the first energy storage element C1 through the first node N1. Another terminal of the first boost circuit IHC and another terminal of the switching element 110 are electrically coupled to a second node N2. That is, the first boost circuit IHC and the switching element 110 are electrically coupled in parallel. The second energy storage element C2 is electrically coupled to the second node N2 and has a second voltage level V2. In some examples, each of the first energy storage element C1 and the second energy storage element C2 includes a capacitor. The switching element 110 includes transistor switches.

The detection circuit 120 is electrically coupled to the first energy storage element C1 and the second energy storage element C2, and configured to detect the first voltage level V1 of the first energy storage element C1 and the second voltage level V2 of the second energy storage element C2 individually. In some embodiments, the detection circuit 120 comprises a voltmeter. The control circuit 130 is electrically coupled to the detection circuit 120, the first boost circuit IHC and the switching element 110, and configured to turn on or turn off the first boost circuit IHC and the switching element 110.

In some embodiments, the first energy storage element C1 and the second energy storage element C2 receive an initial voltage Vin through the first node N1. When the load requires operation at peak power during a short period of time, the output power of the power conversion system 100 will increase accordingly, and the voltage level of the second node N2 will be decreased. When the switching element 110 is turned on, the voltage level at the first node N1 will decrease with the voltage level of the second node N2, so that the first voltage level V1 of the first energy storage element C1 decreases below the first preset level (e.g., 400V). When the control circuit 130 determines that the first voltage level V1 is lower than the first preset level through the detection circuit 120, the control circuit 130 will turn off the switching element 110 and drive the first boost circuit IHC, so that the first boost circuit IHC can draw from the first voltage level V1 of the first energy storage element C1 for boosting to stabilize the voltage level of the second node N2 and prevent the voltage level of the second node N2 from decreasing. That is, the power conversion system 100 maintains the stability of the second voltage level V2 of the second energy storage element C2 according to the first voltage level V1. For convenience of explanation, this operational state of the power conversion system 100 supplying peak power during a short period of time is referred to as a "first state."

On the other hand, when the load does not require operation at peak power during a short period of time, the first voltage level V1 will be equal to or greater than the first preset level. When the control circuit 130 determines that the first voltage level V1 is equal to or greater than the first preset level through the detection circuit 120, the control circuit 130 will turn on the switching element 110 and turn off the first boost circuit IHC, and output power to the load through the second voltage level V2 of the second energy storage element C2. For convenience of explanation, this operational state of the power conversion system 100 supplying non-peak power during a short period of time (i.e., a general state) is referred to as a "second state."

As mentioned above, the control circuit 130 is configured to selectively drive and turn on one of the first boost circuit IHC and the switching element 110 that are coupled in parallel, and turn off the other one of the first boost circuit IHC and the switching element 110 according to the first voltage level V1 detected by the detection circuit 120. When the load requires operation at peak power during a short period of time, the first boost circuit IHC is turned on to increase the first voltage level V1 of the first energy storage element C1 to respond to higher output power. When the load is operating normally, since the load does not require operation at peak power during a short period of time, the control circuit 130 will turn off the first boost circuit IHC to avoid excess power consumption. That is, the switching element 110 has the function of a bypass switch, which can adjust the processing method of the initial voltage Vin according to different operating states. Accordingly, the power conversion system 100 can provide corresponding power according to the requirement of the peak power during a short period of time.

Referring to FIG. 2, in some embodiments, the power conversion system 100 further includes a second boost circuit PFC. The second boost circuit PFC is electrically coupled to the first energy storage element C1 in parallel, and configured to receive a voltage rectified by a diode bridge 160 to generate an initial voltage Vin.

Referring to FIG. 1 and FIG. 2, in some embodiments, the first boost circuit IHC includes a first inductor L1, a first diode D1 and a first switch SW1. The first diode D1 is electrically coupled to the first inductor L1 in series. The first switch SW1 is electrically coupled to the first inductor L1 and the first diode D1. The control terminal of the first switch SW1 is electrically coupled to the control circuit 130, and the control circuit 130 sets the operating duty cycle of the first boost circuit IHC according to the actual load so as to control the switching frequency of the first switch SW1 between turned on and turned off states.

The second boost circuit PFC includes a second inductor L2, a second diode D2 and a second switch SW2. The second diode D2 is electrically coupled to the second inductor L2 in series. The second switch SW2 is electrically coupled to the second inductor L2 and the second diode D2. The control terminal of the second switch SW2 is electrically coupled to the control circuit 130, and is turned on or turned off by the control circuit 130. In the embodiment shown in FIG. 2, the first boost circuit IHC and the second boost circuit PFC have the same circuit architecture, but the present disclosure is not limited thereto. The first boost circuit IHC and the second boost circuit PFC can be implemented by other types of boost circuits. One of ordinary skill in the art is aware of various circuit structures and principles of boost circuits, and thus a description in this regard is not further provided herein.

As shown in FIG. 2, when the power conversion system 100 operates in the first state (i.e., the load requires operation at peak power during a short period of time), an AC voltage Vac will be first boosted by the second boost circuit PFC to generate the initial voltage Vin. Next, the first boost circuit IHC performs a second boost conversion. Accordingly, the power output by the power conversion system 100 can supply the peak power during a short period of time of the load. On the other hand, when the power conversion system 100 operates in the second state (i.e., the load does not require operation at peak power during a short period of time, such as in a normal/general mode), the AC voltage Vac will be first boosted by the second boost circuit PFC to generate the initial voltage Vin. Next, the power conversion system 100 will provide the load power through the switching element 110 according to the initial voltage Vin.

In the embodiment shown in FIG. 1 and FIG. 2, when the power conversion system 100 drives the first boost circuit IHC (i.e., in the first state), the first boost circuit IHC draws power from the first energy storage element C1 (i.e., the first voltage level V1) as the input power for boost conversion. Therefore, in the first state, the first voltage level V1 of the first energy storage element C1 will decrease rapidly.

Figure 3:
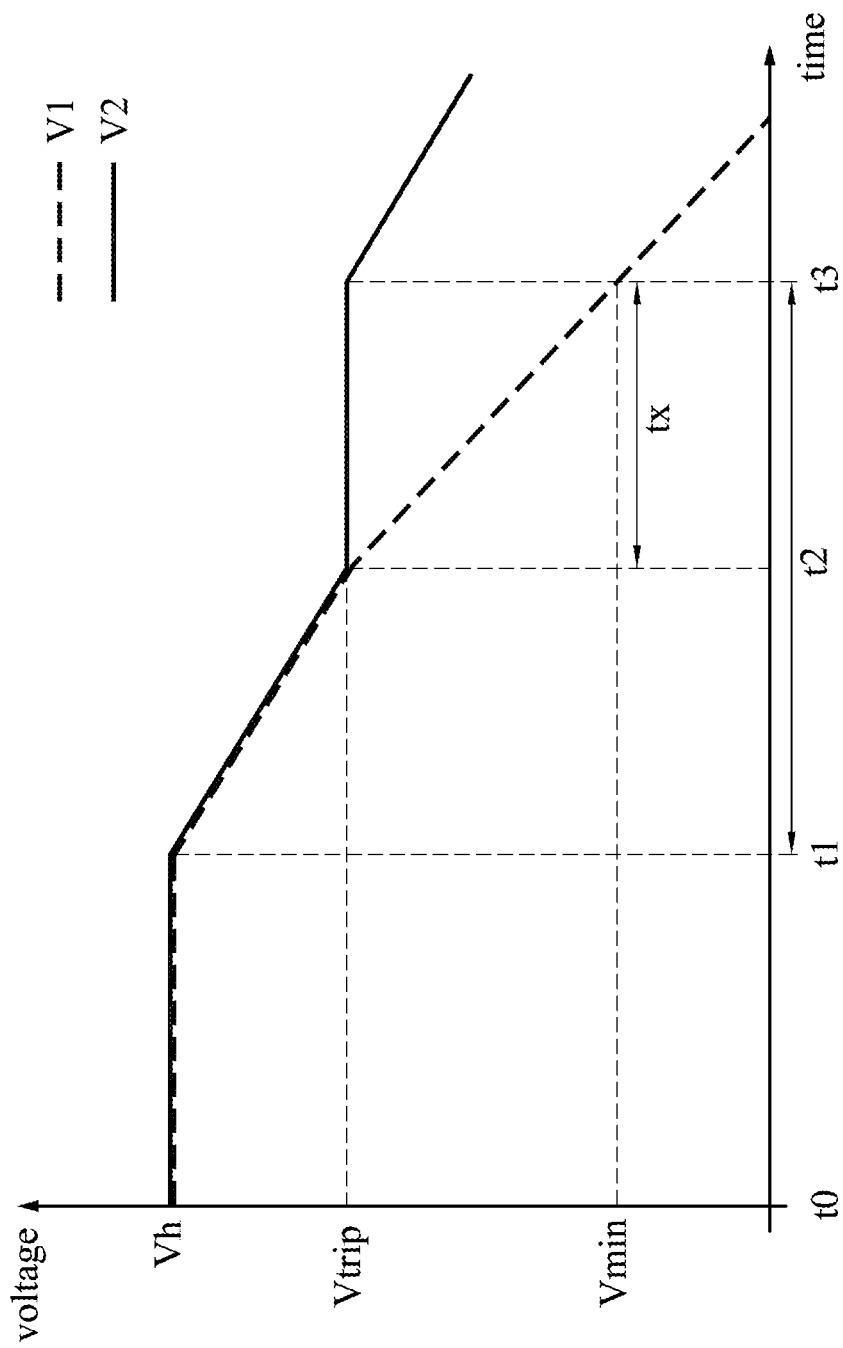
FIG. 3 is a voltage waveform of the power conversion system in some embodiments of the present disclosure.

Reference is now made to FIG. 2 and FIG. 3, in which FIG. 3 is a voltage waveform of the power conversion system in some embodiments of the present disclosure, and shows changes in the first voltage level V1 and the second voltage level V2. The dashed line in FIG. 3 represents the change in the first voltage V1, and the solid line in FIG. 3 represents the change in the second voltage V2.

As shown in FIG. 3, between the time T0 and the time T1, the load does not yet require operation at peak power during a short period of time (or the peak power during a short period of time has not yet affected the voltage level of the first node N1), and the power conversion system 100 operates in the second state (i.e., the switching element 110 is turned on and the first boost circuit IHC is turned off). Both the first voltage level V1 of the first energy storage element C1 and the second voltage level V2 of the second energy storage element C2 are maintained at a preset voltage Vh, which is greater than the first preset level Vtrip.

Between the time T1 and the time T2, the load requires operation at peak power during a short period of time (or, the peak power during a short period of time state has already caused the voltage level of the first node N1 to change), so that the first voltage level V1 of the first energy storage element C1 and the second voltage level V2 of the second energy storage element C2 are decreased until equal to the first preset level Vtrip. Between the time T2 and the time T3, since both of the first voltage level V1 and the second energy storage element C2 are less than the first preset level Vtrip, the power conversion system 100 will be changed to the first state (i.e., the switching element 110 is turned off and the first boost circuit IHC is turned on). At this time, the first boost circuit IHC starts boosting operation according to the first voltage level V1. As a result, the first voltage level V1 of the first energy storage element C1 will decrease rapidly, and the second voltage level V2 of the second energy storage element C2 will be maintained at a stable voltage level by the first boost circuit IHC boost operation.

As mentioned above, in some embodiments, the control circuit 130 starts counting time at the beginning of the first state. If the driving time of the first boost circuit IHC is greater than a preset time tx (for example, 20 ms), or the first voltage level V1 is decreased to a second preset value Vmin, the control circuit 130 stops the power conversion system 100 to avoid damage to the first boost circuit IHC. As shown in FIG. 3, if the control circuit 130 determines that the driving time of the first boost circuit IHC (i.e., the length of time between time T2 to time T3) is greater than the preset time tx, the control circuit 130 will turn off the first boost circuit IHC, stopping the power conversion system 100.

Figure 4A:
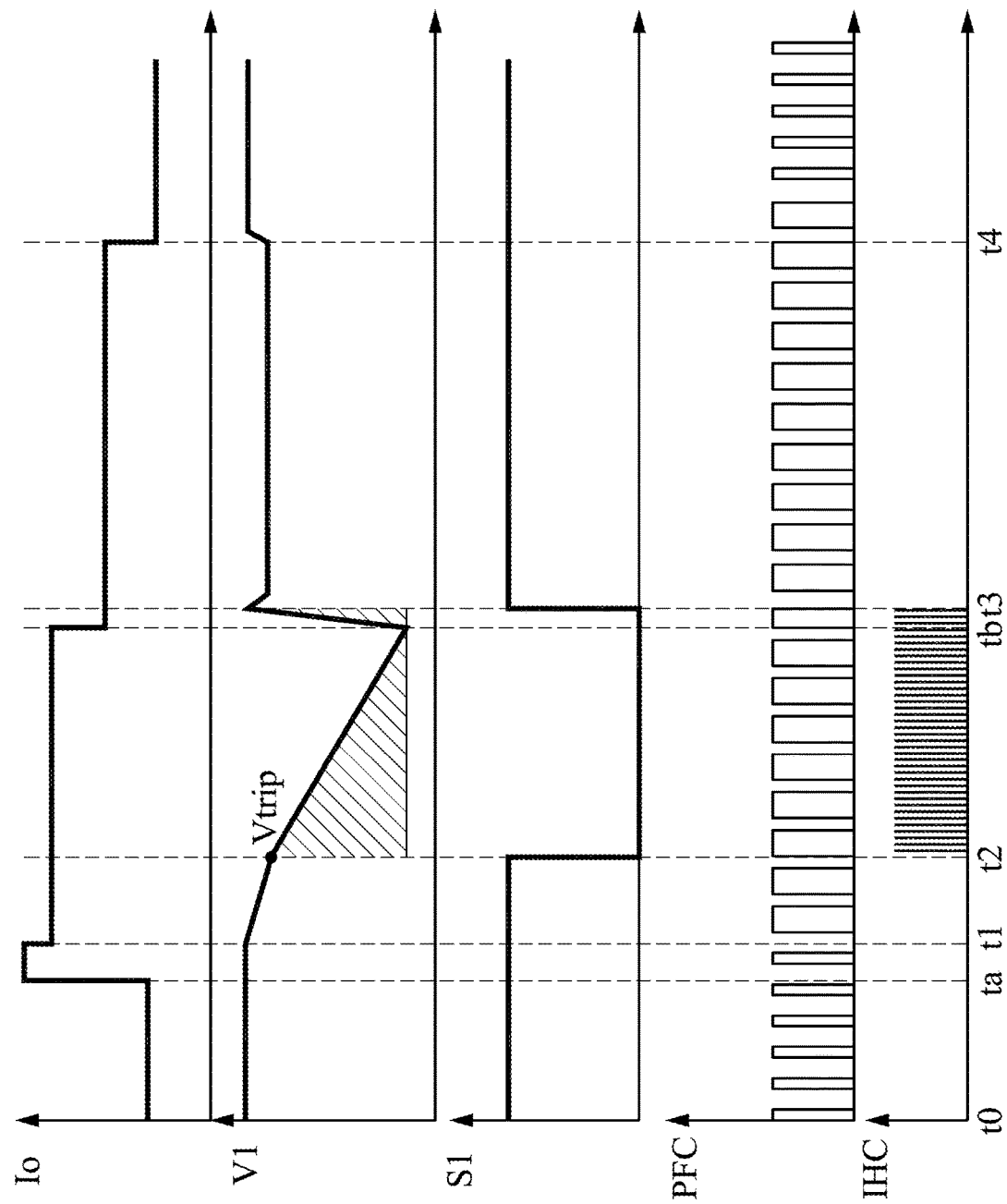
FIG. 4A and FIG. 4B are signal waveforms of the power conversion system in some embodiments of the present disclosure.
Figure 4B:
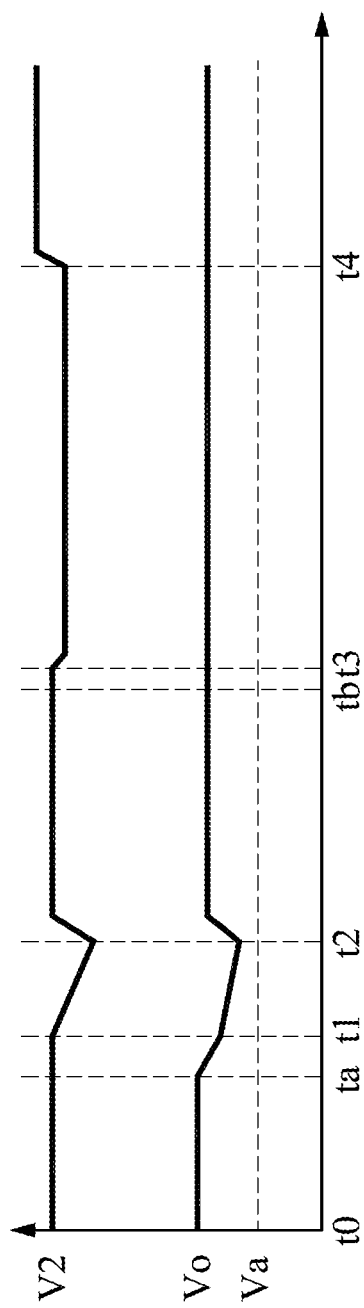
Figure 5:
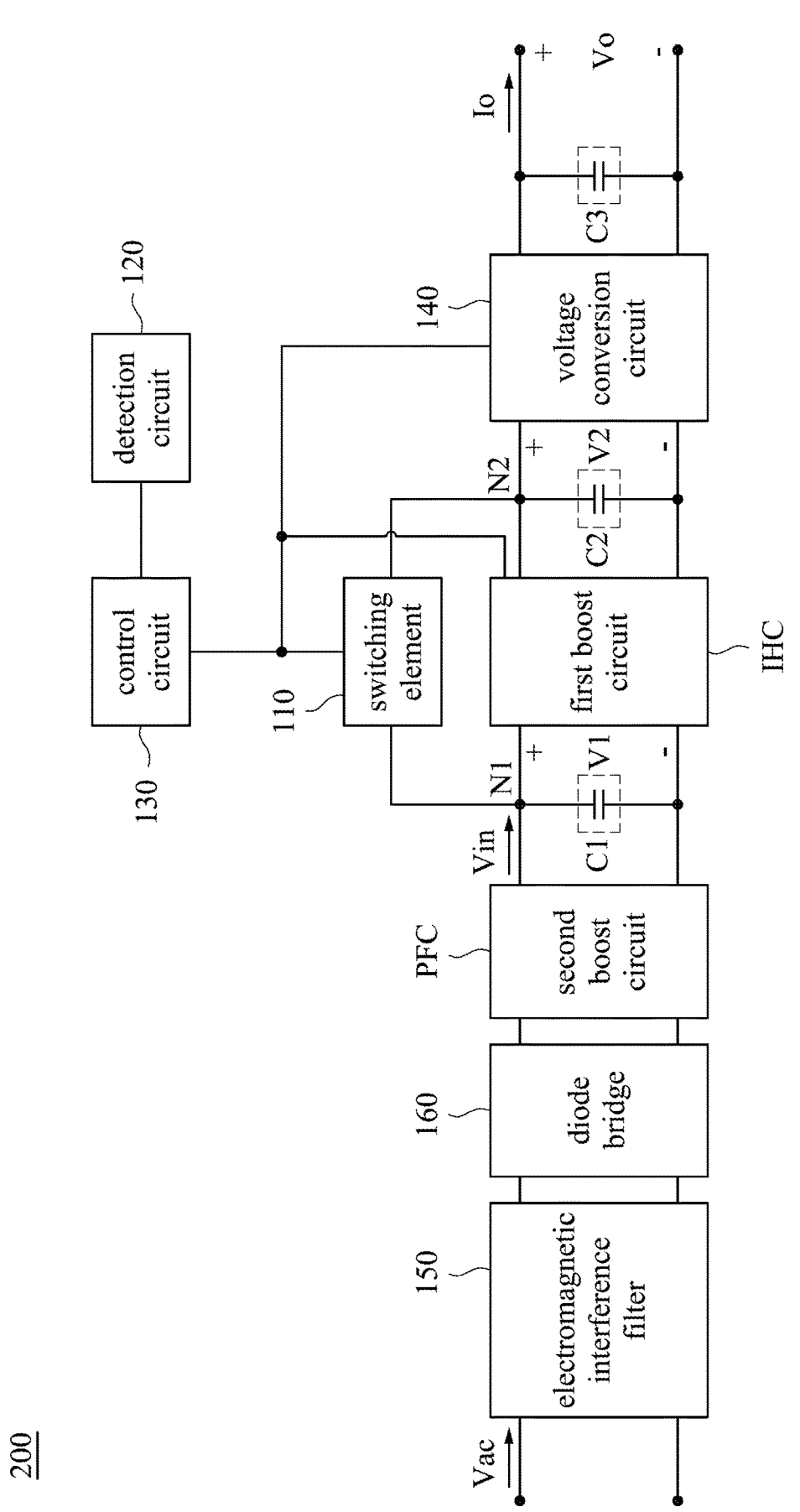
FIG. 5 is a schematic diagram of a power conversion system in some embodiments of the present disclosure.

Referring to FIG. 4A, FIG. 4B and FIG. 5, in some embodiments, the power conversion system 200 also includes a voltage conversion circuit 140 and a third energy storage element C3. The voltage conversion circuit 140 is electrically coupled to the first boost circuit IHC, and has an output side electrically coupled to the load. The third energy storage element C3 is electrically coupled to the output side of the voltage conversion circuit 140 in parallel, and has an output voltage level Vo and an output current value Io. In other embodiments, as shown in FIG. 2, the power conversion system 100 may be electrically coupled to multiple loads at the same time, and output different output voltages Vo1-Von to the corresponding loads, respectively.

The detection circuit 120 is electrically coupled to the third energy storage element C3, and is configured to detect the output voltage level Vo and the output current value Io. The control circuit 130 is electrically coupled to the voltage conversion circuit 140. When the voltage conversion circuit 140 operates in a third state, if the output voltage level Vo is lower than a voltage threshold level (e.g., 320V), the control circuit 130 will stop the power conversion system 100. During the operation of the power conversion system 100, if the first voltage level V1 is less than the first preset level, but the output voltage level Vo is equal to or greater than the voltage threshold level, this indicates that the load requires operation at peak power during a short period of time, so that the power conversion system 100 operates in the first state. At this time, the control circuit 130 changes the operation state of voltage conversion circuit 140 from the third state to the fourth state, and the rated power value of the third state is less than the rated power value of the fourth state (e.g., the rated power is increased from 2 KW to 3 KW).

In addition, the power conversion system 100 has an over current protection (OCP) mechanism. The detection circuit 120 can detect the output current value Io. When the output current value Io is greater than a first current threshold value (100A), the detection circuit 120 provides a notification so that the control circuit 130 stops the power conversion system 100. However, when the power conversion system 100 operates in the first state, in order to respond to the condition of peak power during a short period of time, the value of the output current value Io should be modified to be higher than the value of the output current value Io in the second state. Therefore, in order to prevent the OCP mechanism from being triggered by mistake, in the situation that the first voltage level V1 is less than the first preset level, but the output voltage level Vo is equal to or greater than the voltage threshold level, when the output current value Io is equal to or greater than the first current threshold value, the control circuit 130 modifies the first current threshold value to a second current threshold value. The first current threshold value is less than the second current threshold value (e.g., 120 A) to thereby modify the trigger threshold of the OCP mechanism. If the output current value Io is equal to or greater than the second current threshold value, the control circuit 130 will activate the OCP mechanism to stop the power conversion system 100.

On the other hand, in an operating state in which the first voltage level V1 is equal to or greater than the first preset level, this indicates that the load does not require operation at peak power during a short period of time. Therefore, when the output current value Io is equal to or greater than the first current threshold value, the control circuit 130 directly controls the power conversion system 100 to stop operating. That is, the control circuit 130 performs the OCP mechanism according to the first current threshold value.

Reference is made to FIG. 3, FIG. 4A and FIG. 4B, in which FIG. 4A and FIG. 4B are signal waveforms of the power conversion system 100, which are used to show the timing waveform changes of the output current value Io, the first voltage level V1, the second voltage level V2, the first boost circuit IHC and the second boost circuit PFC. In addition, a control signal S1 represents the state of a control signal which is configured to control the switching element 110 to be turned on or turned off. When the control signal S1 is at a low level, this indicates that the switching element 110 is turned off. When the control signal S1 is at a high level, this indicates that the switching element 110 is turned on. At time Ta, the load requires operation at peak power during a short period of time, making the output current value Io increase, but the first voltage level V1 has not changed. At time T1, the first voltage level V1 begins to decrease. At this time, the second boost circuit PFC will increase the duty cycle of its pulse width modulation to increase the magnitude of the boost. If the first voltage level V1 continues to decrease, and decreases below the first preset level Vtrip, then the control circuit 130 can confirm that the current status is peak power during a short period of time, and controls the power conversion system 100 to enter into the first state at time T2. At this time, the switching element 110 will be turned off, the first boost circuit IHC will be turned on and driven, and the switching frequency of the first switch SW1 in the first boost circuit IHC will be higher than the switching frequency of the second switch SW2 in the second boost circuit PFC.

As shown in FIG. 4A and FIG. 4B, the period from time t2 to time t3 corresponds to the first state. At time tb, the power requirement of the load changes, and the output current value Io decreases slightly. At this time, the first voltage level V1 of the first energy storage element C1 will be increased accordingly, making the first voltage level V1 higher than the first preset level Vtrip. When the first voltage level V1 is increased to the first preset level Vtrip, the control circuit 130 will control the power conversion system 100 into the second state. However, as shown in FIG. 4A, due to the delay of the action of the control circuit 130, the first voltage level V1 may slightly exceed the first preset level Vtrip in an instant, and the switching action of the first boost circuit IHC will continue for some time without interrupting operation immediately. Before turning on the switching element 110, the control circuit 130 needs to turn off the first boost circuit IHC to prevent the second voltage level V2 from being too high. The present disclosure can ensure that when the load requires operation at peak power at a specific time, the output voltage Vo is always maintained above a voltage protection threshold Va. After time t4, the load returns to the normal operational state, and the output voltage Vo and the output current value Io then return to normal values.

FIG. 5 is a schematic diagram of a power conversion system in some other embodiments of the present disclosure. In FIG. 5, the similar components associated with the embodiment of FIG. 1 and FIG. 2 are labeled using the same reference numerals for ease of understanding. The specific principles of similar components have been explained in detail in the previous paragraphs, and unless such components have a cooperative relationship with the components of FIG. 5, a description of the same is not repeated. In this embodiment, the second boost circuit PFC receives the AC voltage Vac through the electromagnetic interference filter 150 and the diode bridge 160.

Figure 6:
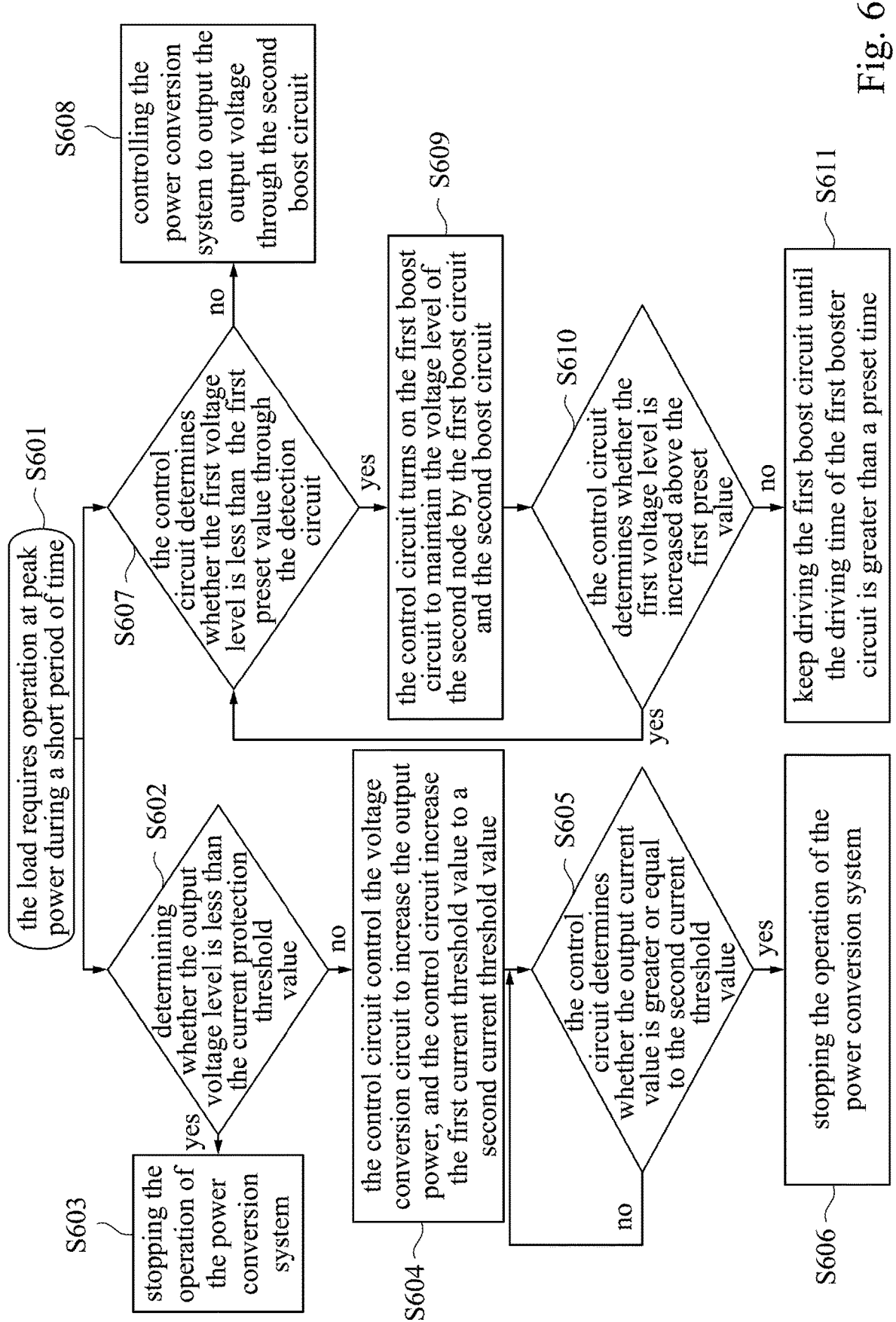
FIG. 6 is a flowchart of the operation of the power conversion system in some embodiments of the present disclosure.

Reference is now made to FIG. 6, which is a flowchart to explain the operation of the power conversion system 100 when the load requires operation at peak power during a short period of time. In step S601, the load requires operation at peak power during a short period of time (e.g., at a certain moment). At this time, the power conversion system 100 performs determinations separately with respect to a "DC to DC circuit" and an "AC to DC circuit." The "DC to DC circuit" mainly performs corresponding actions according to the output current value Io, corresponding to step S602 to step S606 in FIG. 6. The "AC to DC circuit" operates according to the first voltage level V1, which corresponds to steps S607 to step S611 in FIG. 6.

First, in step S602, the control circuit 130 determines whether the output voltage Vo is lower than the current protection threshold value Va. If the output voltage Vo is less than the current protection threshold value Va, go to step S603, the control circuit 130 will directly turn off the power conversion system 100 to stop the power conversion system 100 and prevent damage to internal components of the power conversion system 100. If the output voltage Vo is not less than the current protection threshold value Va, go to step S604, the control circuit 130 controls the voltage conversion circuit 140 to increase its output power (i.e., the operation state of the voltage conversion circuit 140 is changed from the third state to the fourth state). At the same time, the control circuit 130 modifies the current threshold value from the first current threshold value to the second current threshold value. In step S605, the control circuit 130 determines whether the output current value Io is equal to or greater than the second current threshold value through the detection circuit 120. If the output current value Io is equal to or greater than the second current threshold value, go to step S606, the control circuit 130 stops the operation of the power conversion system 100.

In addition, in the process of the "AC to DC" circuit, in step S607, the control circuit 130 determines whether the first voltage level V1 is greater than or equal to the first preset level Vtrip through the detection circuit 120. If the first voltage level V1 is greater than or equal to the first preset level Vtrip, go to step S608, the power conversion system 100 is controlled to operate in the second state, and maintain the output voltage Vo through the second boost circuit PFC. If the first voltage level V1 is less than the first preset level Vtrip, go to step S609, the control circuit 130 turns off the switching element 110 and turns on the first boost circuit IHC to perform second boosting processes through the second boost circuit PFC and the first boost circuit IHC so as to maintain the voltage level of the second node N2 and generate the output voltage Vo.

In step S610, the control circuit 130 determines whether the first voltage level V1 is increased above the first preset level Vtrip through the detection circuit 120. If the first voltage level V1 is increased above the first preset level Vtrip, the process returns to step S607. If the first voltage level V1 has not increased to be higher than the first preset level Vtrip, go to step S611, the first boost circuit IHC is continuously driven until the driving time of the first boost circuit IHC is greater than the preset time tx.

The elements, method steps, or technical features in the foregoing embodiments may be combined with each other, and are not limited to the order of the description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power conversion system, comprising:
   a first energy storage element having a first voltage level;
   a second energy storage element having a second voltage level;
   a first boost circuit electrically coupled between the first energy storage element and the second energy storage element;
   a switching element electrically coupled in parallel to the first boost circuit;
   a control circuit electrically coupled to the first boost circuit and the switching element;
   a detection circuit electrically coupled to the first energy storage element and the control circuit, and configured to detect the first voltage level, wherein when the first voltage level is less than a first preset level, the control circuit turns off the switching element, and drives the first boost circuit to maintain the second voltage level according to the first voltage level, and the power conversion system operates in a first state; and when the first voltage level is greater than or equal to the first preset level, the control circuit turns on the switching element, and turns off the first boost circuit, and the power conversion system operates in a second state; and
   a voltage conversion circuit electrically coupled to the first boost circuit, and having an output side; and
   a third energy storage element electrically coupled in parallel to the output side, and having an output voltage level and an output current value, wherein the detection circuit is electrically coupled to the third energy storage element, the control circuit is electrically coupled to the voltage conversion circuit, the voltage conversion circuit operates in a third state, and when the output voltage level is less than a voltage threshold level, the control circuit stops the power conversion system.

2. The power conversion system of claim 1, wherein when a driving time of the first boost circuit is greater than a preset time, the control circuit stops the power conversion system.

3. The power conversion system of claim 1, wherein when the first voltage level is less than the first preset level and the output voltage level is greater than or equal to the voltage threshold level, the control circuit controls the voltage conversion circuit to operate in a fourth state from the third state, and a rated power value of the third state is less than a rated power value of the fourth state.

4. The power conversion system of claim 3, wherein when the output current value is greater than or equal to a first current threshold value of the voltage conversion circuit, the control circuit modifies the first current threshold value to a second current threshold value, and the first current threshold value is less than the second current threshold value.

5. The power conversion system of claim 4, wherein when the output current value is greater than or equal to the second current threshold value, the control circuit stops the power conversion system.

6. The power conversion system of claim 3, wherein when the first voltage level is greater than or equal to the first preset level, and the output current value is greater than or equal to a first current threshold value of the voltage conversion circuit, the control circuit stops the power conversion system.

7. The power conversion system of claim 1, wherein the first boost circuit comprises:
   a first inductor;
   a first diode electrically coupled in series to the first inductor; and
   a first switch electrically coupled to the first inductor and the first diode.

8. The power conversion system of claim 1, further comprising a second boost circuit, wherein the second boost circuit is electrically coupled in parallel to the first energy storage element.

9. The power conversion system of claim 8, wherein the second boost circuit comprises:
   a second inductor;
   a second diode electrically coupled in series to the second inductor; and
   a second switch electrically coupled to the second inductor and the second diode.

* * * * *